Dec. 5, 1950 F. J. DITTER 2,532,611
AIRCRAFT SKI
Filed June 18, 1949 2 Sheets—Sheet 1
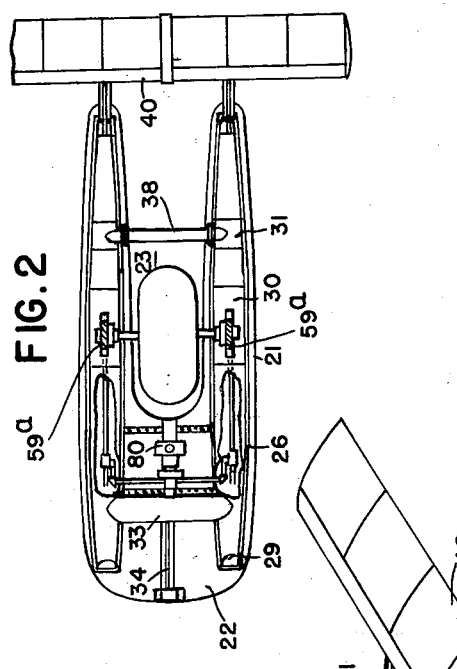
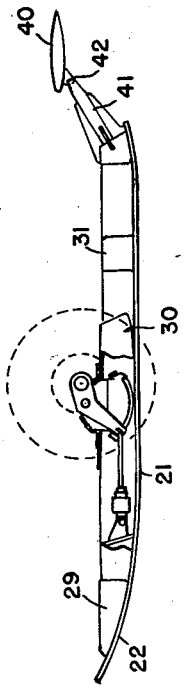
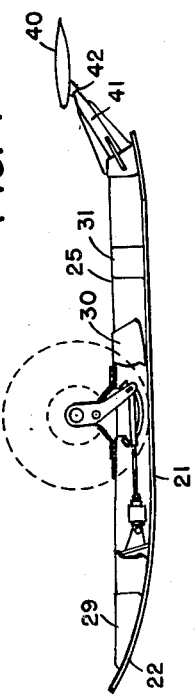
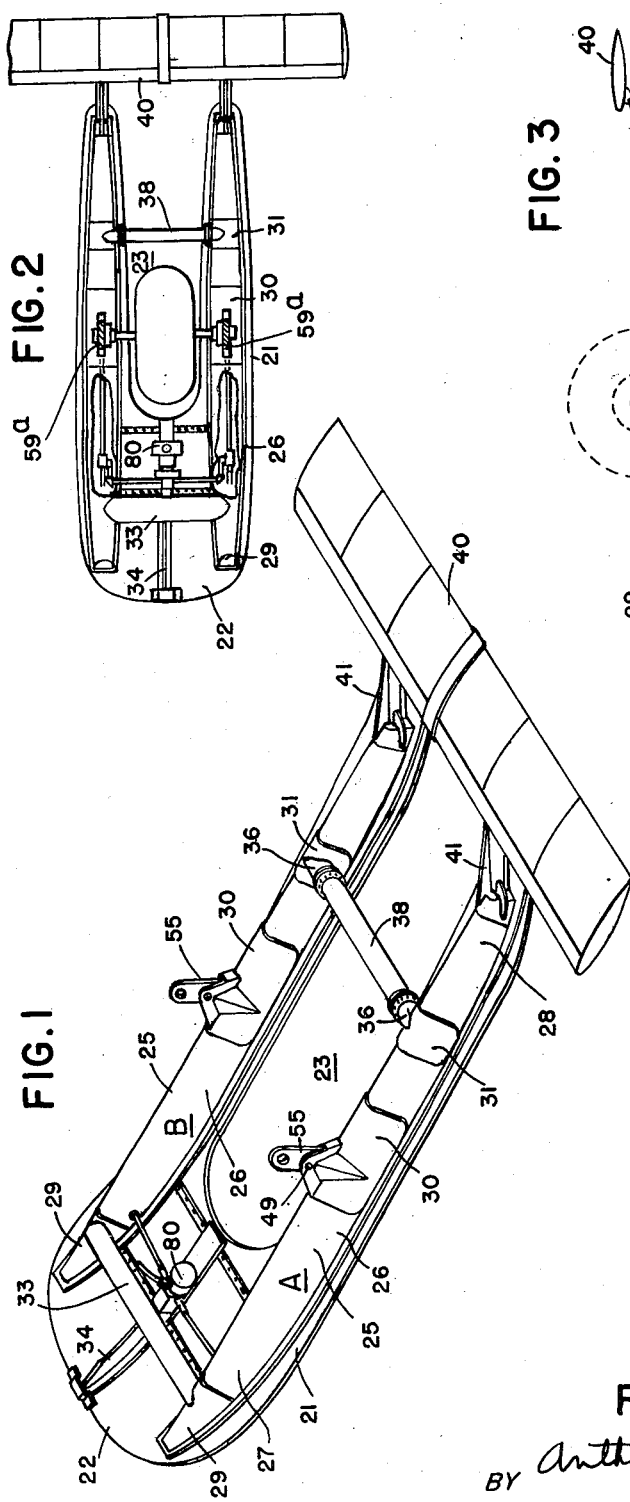
INVENTOR:-
FRANCIS J. DITTER
BY Anthony A. Juettner
ATTORNEY Dec. 5, 1950　　　　　F. J. DITTER　　　　2,532,611
AIRCRAFT SKI
Filed June 18, 1949　　　　　　　　　　2 Sheets-Sheet 2
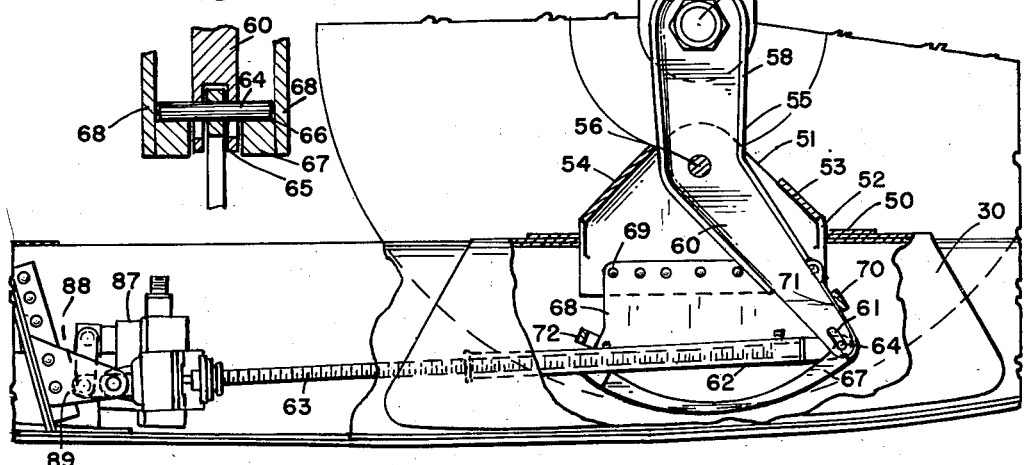
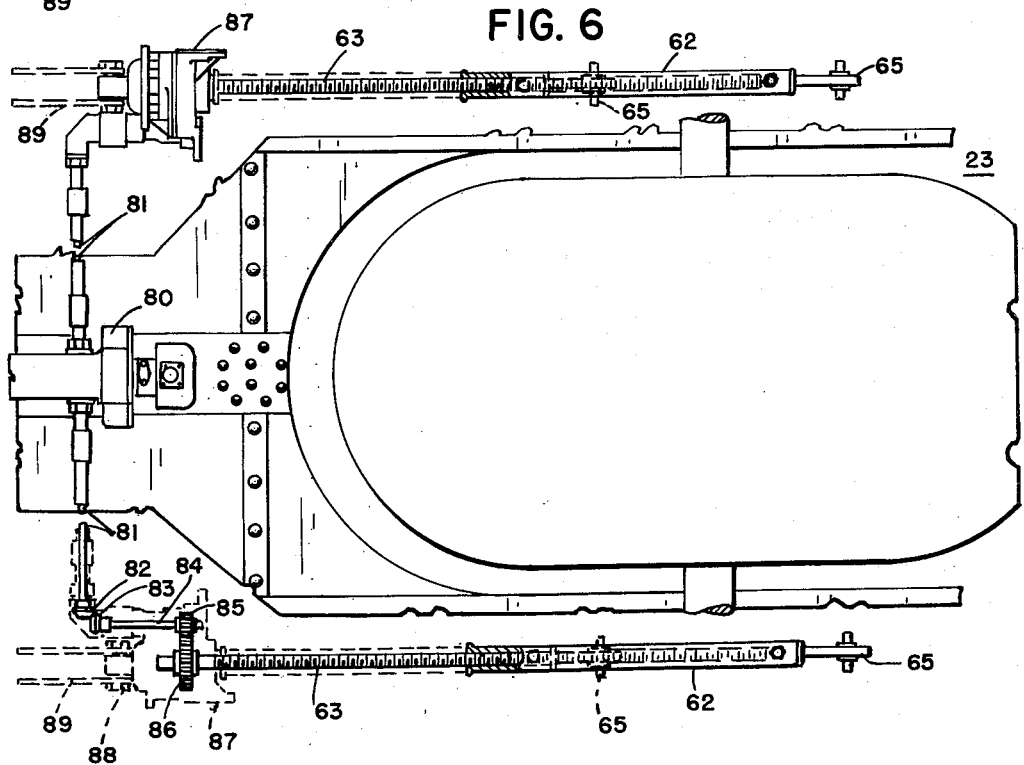
INVENTOR.-
FRANCIS J. DITTER
BY Anthony A. Juettner
ATTORNEY Patented Dec. 5, 1950

2,532,611

UNITED STATES PATENT OFFICE 2,532,611

AIRCRAFT SKI

Francis J. Ditter, Minneapolis, Minn.

Application June 18, 1949, Serial No. 99,899

7 Claims. (Cl. 244—108)

The present invention relates to an aircraft ski and more particularly to an aircraft ski which is retractable relative to the wheel shaft of the conventional landing gear of the airplane. The present application is a continuation-in-part of my copending application, Serial No. 37,895, filed July 9, 1948, entitled Aircraft Ski.

In that application there is described an aircraft ski which is movable relative to the wheel shaft of the conventional landing gear of an airplane, such that both the wheel and the aircraft ski may be in position on the aircraft simultaneously. A number of modifications are described, including one modification involving a divided ski such that the aircraft wheel is positioned between two segments of the aircraft ski. In that modification the actuation is accomplished by means of a shaft passing through the hollow wheel shaft. The present invention is directed to a modification of the invention described in the above identified application, in which a divided ski is employed and in which the actuation of the ski relative to the aircraft wheel is accomplished by means outside the wheel shaft.

It is therefore an object of the present invention to provide an aircraft ski which is mountable on the conventional landing gear of an aircraft and which is movable relative to the wheel shaft of said landing gear, the means for actuating the ski relative to the wheel shaft being external of the wheel shaft.

This and other objects of the invention will be more fully apparent from the following description of the invention with particular reference to the drawings in which Figure 1 is a perspective of a ski embodying the present invention;

Fig. 2 is a plan view partly in section of the ski of Fig. 1;

Figs. 3 and 4 are side elevations of the ski illustrated in Figs. 1 and 2, being shown partly in section to illustrate the position of the ski relative to the aircraft wheel in the two limits of movement;

Fig. 5 is a side elevation of a partial cross-section of the ski mounting and actuation mechanism;

Fig. 6 is a plan view partly in section of the drive mechanism for the ski actuating mechanism; and Fig. 7 is a fragmentary cross-section of the locking mechanism illustrated in the actuation mechanism of Fig. 5, in an intermediate position of the movement of the actuation mechanism.

In my copending application above identified there is disclosed a modification of the invention in which there is employed a divided ski having a mounting pedestal on each section of the ski, a lever arm pivoted on the mounting pedestal, and the upper ends of the lever are rigidly mounted on a shaft which passes through the hollow wheel shaft of the airplane. By means of a hydraulic cylinder actuating one of the lever arms and the rigid connection between the two lever arms, this mechanism has made possible the operation of both lever arms in unison from a single actuating cylinder. This modification, however, is dependent upon the use of a wheel shaft which is hollow and permits the passing of a second shaft therethrough.

The present modification of the invention is directed to the simultaneous actuation of a pair of lever arms by means of an external mechanism and is particularly adapted for use on aircraft having solid wheel shafts or those in which the opening in the wheel shaft is not sufficiently large to pass a shaft of sufficient strength for this particular operation.

With reference to Figs. 1 and 2, the ski is composed of two sections A and B, which are of a generally similar nature. The ski is generally constructed in accordance with the disclosure of my copending application Serial No. 706,883, filed October 31, 1946, entitled Aircraft Ski. In accordance with the teachings of that application, the ski is composed of a base shoe 21, which is preferably of a relatively heavy gauge sheet metal, preferably aluminum or magnesium, although other materials such as plywood may be used. This base shoe has a contour of a generally U-shaped nature as shown in the plan view of Fig. 2. The front end of the ski 22 is in the position of the base of the U and is upturned somewhat for the purpose of climbing on top of snow and gradually packing it down. This toe of the ski extends backward a short distance and then the sheet is cut out as indicated by space 23, which extends from slightly forward of the wheel to the rear end of the ski. Some cut-out space is provided in advance of the wheel inasmuch as it has been found that as the ski travels along snow-covered ground a considerable quantity of snow blows over the top of the front end of the ski and would normally tend to pile up in the space ahead of the wheel, were the base of the shoe continuous across this space. It is found that by having this space cut out the snow may fly over the toe of the ski and down into space 23 and may then be packed by the oncoming wheel. In this way it is found that relatively little snow piles up on the ski and thus excessive weight during flight is avoided.

Superimposed on the base shoe are a pair of inverted channel members 25, which preferably have an inverted V cross-section with side flanges 26 extending outwardly from the ends of the V. The inverted V-shaped channels are preferably formed such that the base of the V forms a substantially straight line along the length of the ski and the outer ends of the V are cut short as indicated at 27 and 28 at the toe and heel of the ski respectively. This is for the purpose of adapting the channel member to the contour of the base shoe which curves upwardly both at the toe and heel. The base shoe may be curved substantially continuously longitudinally, but the curvature is more pronounced at the toe and heel. In larger skis the intermediate section of the ski's length may be substantially flat, whereas in smaller skis it may be desirable to have the base shoe in a more or less continuous curve.

The inverted channel members may be attached to the base shoe in any suitable manner as by rivets passing through flanges 26 and through the base shoe, by spot-welding, bolting, or in any other suitable manner. The various structural elements of the ski may be attached to these channels through saddle members 29, 30, and 31, respectively. The saddle members 29 correspond to the shape of the channel member at this point and are principally for the purpose of reinforcing the channel at this point and for distributing load over a wider section of the channel. A front tie member 33 extends from one side of the ski to the other and is attached to the saddle members 29. The saddle members 29 may be of steel and the tie member 33 may likewise be of steel and attached to the saddle by means of welds. It is apparent, however, that the material of construction of members 29 and 33 may be varied and if desired these may also be constructed of light metals such as aluminum or magnesium, and other means of fastening may be employed. A reinforcing member 34 may be attached to the base shoe and the tie member 33 to strengthen the structure at this point.

Saddle members 31 are provided with lateral tubular sections 36 which extend inwardly between the two sections A and B of the ski. Sections 36 terminate inwardly in flanges to which may be attached flanges on tubular section 38. These flanges are preferably bolted together such that they may be readily removed for a purpose to be described hereinafter.

The ski may be rigged for its position in flight and during taxiing operations in any suitable manner. In Figs. 1 and 2, I have illustrated the use of an airfoil 40 for this purpose. This airfoil is supported by a pair of brackets 41 extending upwardly from the heel end of the sections A and B. This is in accordance with the teachings of my copending application Serial No. 779,173, filed October 10, 1947, entitled Rigging for Aircraft Landing Skid. The airfoil is preferably supported on the brackets 41 by bolts 42 (Fig. 3 and 4), in order that the airfoil may be readily removed for a purpose to be described later.

The means for attaching the ski to the wheel shaft of an airplane and the actuation means are illustrated in detail in Figs. 5, 6 and 7. With reference to Fig. 7, the saddle 30 is shown to conform to the contour of the channel member 25, but has an opening therein along the ridge of the channel. Near the opening an auxiliary saddle 50 overlies saddle 30 and reinforces it. A pair of saddle flange or pedestal members 51 are inserted in the opening in saddle 30 and saddle 50, and are suitably supported therein, as for example by the welding 52. These two saddle flanges are spaced apart and are further supported in their spaced-apart position by means of side plates 53 and 54, respectively, which are suitably attached to the saddle flange members, as for example by means of welding. The lever arm, generally indicated as 55, is pivoted about pin 56, which passes through the lever arm, and which in turn is supported in the saddle flanges 51. The lever arm is composed of an upstanding section 58 which is pivoted at its upper end in the wheel shaft 59 of the aircraft landing gear, supported on strut 59a. The lever arm is provided with a lower section 60 which is offset somewhat from the upper section 58. This section of the lever arm is provided at its lower end with an elongated slot 61. The lower segment of the lever arm 60 is connected to the housing 62 of jackscrew 63 by means of pin 64. With reference to Fig. 7, the lower end of lever arm 60 is bifurcated and the end 65 of the jackscrew housing 62 is disposed between the two segments of the bifurcated lever arm 60. Pin 64 passes through the bifurcated lever arm 60 and through the end 65 of the jackscrew housing. In the intermediate position of movement of the lever arm 60, which is shown in Fig. 7, pin 64 rides on the upper edge 66 of guide members 67, which are arcuate in outline as shown in Fig. 5. Pin 64 is maintained in position by side plates 68, which are supported dependently from saddle flanges 51 by means of rivets or bolts or welds 69. Guide members 67 are suitably supported on the side plates 68.

The righthand end of the arcuate guide 67 is substantially parallel to the center line of the lower section 60 of lever arm 55. The lefthand end of arcuate guide 67 is likewise parallel to the center line of this lower section of the lever arm in the other limit position. In this manner any load applied to the pin 64 through the lever arm 60 will be normal to the end surface of the arcuate guide. It will be apparent, therefore, that the lever arm will thus be locked in this position. It will also be apparent that jackscrew housing 62 has a component of force in a direction along the center line of the lower section 60 of the lever arm towards the pivot 56 when the lever arm is in either of its two limit positions and when force is applied to the jackscrew housing to effect movement of the lever arm toward its other limit position. This component of force in the direction of pivot 56 is sufficient to raise the pin 64 in the slot 61 until it will ride along the top 66 of the arcuate guides 67. This position of the pin is illustrated in Fig. 7.

With further reference to Fig. 5, it will be apparent that the position of lever arm 60 in Fig. 5 is the position in which the skis are in operative position. The forward end of the ski is to the left in Fig. 5. The thrust of the motor on wheel shaft 59 is to the left, and accordingly this thrust is limited by means of stop 70 on the side plate 68 when this stop comes in contact with the adjacent point 71 on the lower section 60 of the lever arm. In this manner there is no thrust on the jackscrew system to resist the thrust of the motor and the drag of the ski. The conditions on landing are the same as during takeoff.

In the reverse position of the lever arm 60, that is, in which the lever arm is moved so that its lower end is in the limit position on the left in Fig. 5, the weight of the ski on the lever arm will be borne by the end of the arcuate guide 67 through the pin 64, and will not have to be borne through the jackscrew system. A stop 72 is provided adjacent the lefthand limit position of the lever arm. When the lever arm hits this stop, further movement of the jackscrew serves to move pin 64 into locking position at the left end of the arcuate guide. It is apparent, therefore, that by this means there has been provided a locking device for locking the ski in its two limit positions and for taking the thrust of the motor, the drag and weight of the ski, on the actual structural devices of the ski without applying any load on the actuating mechanism for changing the position of the ski. This locking device is of considerable importance in insuring that the ski will remain in whichever position it is during a takeoff or landing operation and to prevent any change in the position of the ski at a time when a change might be disastrous.

The means for driving the jackscrews 63 is illustrated in Fig. 6. A suitable motive device such as electric motor 80 is provided with a symmetrical driving mechanism extending from each side of the motor. The side illustrated in section is composed of a flexible shaft 81, terminating in a bevel gear 82, which meshes with a further bevel gear 83 keyed to a shaft 84. A gear 85 keyed to shaft 84 drives gear 86 which is internally threaded for receipt of jackscrew 63. Gears 82, 83, 85 and 86, together with shaft 84, are enclosed in a common gear housing 87 which is pivoted at 88 to the support 89 mounted on the ski. This pivoting of the housing 87 permits the vertical movement of the end 65 of jackscrew 63 in Fig. 5 during the movement of the jackscrew from one limit position to the other.

Motor 80 may be provided with suitable leads to a suitable source of power. Controls within the cockpit serve to energize the motor at any desired time. The mechanism may likewise be provided with suitable limit controls which automatically shut off the motor at any desired position.

As shown in Figs. 1 and 2, the motor 80 is supported on the ski by means of the portion of the shoe intermediate the two channels and somewhat forward of the space cut out in the shoe for the wheel.

It is thus apparent that there is provided a novel arrangement whereby a divided ski may be actuated about the wheel shaft of an airplane by means of a mechanism disposed outside the wheel shaft. This makes possible the actuation of the ski from a dry landing surface position in which the airplane wheel protrudes through the ski as shown in Fig. 3 to a snow or ice landing position in which the ski takes essentially the main load of the landing although the wheel may protrude slightly below the ski surface.

For mounting the ski the wheel may be left in position on its wheel shaft on the airplane. Bolts 42 are removed which permits the removal of the airfoil 40. Cross member 38 may then be removed by removing the bolts which fasten the flanges on members 36 and 38 together. Thereafter the ski may be slid to the rear surrounding the wheel and the upper portion 58 of lever arm 55 may be suitably attached to the hub of the aircraft wheel shaft. Thereafter member 38 and airfoil 40 may be replaced. In this manner there is no necessity for jacking up the airplane and removing the wheel. The operation of attaching the ski to the aircraft may be accomplished readily in the field and without the necessity for unusual tools.

In the above description there is provided a positive mechanical drive for effecting simultaneous movement of the lever arms. In place of this positive mechanical movement there may be provided other means such as a single hydraulic cylinder in the position of the electric motor, together with a pair of hydraulic leads to a pair of actuating cylinders connected to the pair of lever arms. A flow divider may be provided to equalize the pressure and volume of hydraulic fluid fed to each of the actuation cylinders. Such an alternate arrangement would function in much the same manner as the positive mechanical drive described in detail.

I claim as my invention:

1. An aircraft ski comprising a pair of inverted channel members extending generally parallel, a U-shaped base member having the arms of the U extending beneath the inverted channel members and attached thereto, the base of the U extending between the channel members at the forward end thereof, each of said inverted channel members having a pedestal mounted intermediate the length thereof, a pair of lever arms, one mounted in each of said pedestals, one end of one of said lever arms extending through the channel member into the interior of the ski, driving means for said lever arms, said driving means being disposed on the base of said U, and connections between said driving means and each of said lever arms.

2. An aircraft ski comprising a pair of inverted channel members extending generally parallel, a U-shaped base member having the arms of the U extending beneath the inverted channel members and attached thereto, an opening in each of said channel members near the base thereof, support means mounted in said opening and extending upwardly from the base of the channel, a lever arm pivotally supported intermediate its length on said support means, an upper portion of said lever arm having at its uppermost end means for attachment to the landing wheel shaft of an airplane, the lower portion of the lever arm extending through the opening in the channel into the interior of the ski and being pivotally connected at its lower end to an actuating means, said pivotal connection including a pin passing through the actuating means and through an elongated slot in the lower end of the lever arm, said elongated slot extending generally along the center line of the lower portion of the lever arm, arcuate guide means for said pin, the distance from the intermediate pivot of the lever arm to each end of the arcuate guide means being less than the distance from the intermediate pivot of the lever arm to the outward end of the elongated slot, the ends of the arcuate guide means being substantially parallel with the center line of the lower portion of the lever arm at its corresponding limit of movement, driving means for said lever arms, said driving means being disposed on the base of said U, and connections between said driving means and each of said lever arms.

3. An aircraft ski comprising a pair of ski sections extending generally parallel, a base shoe of generally U-shaped form, the arms of the U forming the bottom surface of the ski sections, the base of the U extending between the ski sections at the forward end thereof, a lever arm pivotally supported on one of said ski sections, a lever arm pivotally supported on the other of said sections, means on one end of each of said lever arms for attachment to the landing wheel shaft of an airplane, driving means mounted on the ski, and means connecting said driving means and the other end of each said lever arm for pivotal movement of said lever arms.

4. An aircraft ski according to claim 3 in which the driving means is located on the base shoe between the ski sections.

5. An aircraft ski comprising a pair of inverted channel members extending generally parallel, a base shoe of generally U-shaped form, the arms of the U extending beneath the inverted channel members and being attached thereto, the base of the U extending between the channel members at the forward end of said channel members, a lever arm pivotally supported on one of said inverted channel members, another lever arm pivotally supported on the other of said inverted channel members, means on one end of each of said lever arms for attachment to the landing wheel shaft of an airplane, driving means mounted on the ski, and means connecting the driving means and the other end of each of said lever arms for pivotal movement of said lever arms.

6. An aircraft ski according to claim 5 in which the driving means is mounted on the base shoe intermediate the channel members, and the means connecting the driving means and the other end of said lever arms comprises a pair of drives extending laterally from the driving means to and into the inverted channels, then inside and parallel to the axis of the channels for attachment to the other end of said lever arms.

7. An aircraft ski according to claim 6 in which the lever arms are adapted to move between two limit positions of movement, and there is provided locking means for locking the ski in its two limit positions of movement.

FRANCIS J. DITTER.

REFERENCES CITED

The following references are of record in the file of this patent:

UNITED STATES PATENTS

| Number | Name | Date |
| --- | --- | --- |
| 1,844,295 | Perry | Feb. 9, 1932 |
| 2,106,934 | Saulnier | Feb. 1, 1938 |
| 2,215,598 | Sznycer | Sept. 24, 1940 |

FOREIGN PATENTS

| Number | Country | Date |
| --- | --- | --- |
| 71,226 | Sweden | Feb. 24, 1931 |